US011111153B2

(12) United States Patent
Kamakoti et al.

(10) Patent No.: US 11,111,153 B2
(45) Date of Patent: Sep. 7, 2021

(54) PROCESS FOR MAKING MOLECULAR SIEVES

(71) Applicant: ExxonMobil Research and Engineering Company, Annandale, NJ (US)

(72) Inventors: Preeti Kamakoti, Summit, NJ (US); Scott J. Weigel, Allentown, PA (US); Karl G. Strohmaier, Port Murray, NJ (US); Helge Jaensch, Grimbergen (BE); Marc H. Anthonis, Hofstade (BE); Martine Dictus, Willebroek (BE); Brita Engels, Aarschot (BE); Darryl D. Lacy, Easton, PA (US); Sina Sartipi, Woluwe-Saint-Lambert (BE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 28 days.

(21) Appl. No.: 16/545,079

(22) Filed: Aug. 20, 2019

(65) Prior Publication Data

US 2020/0062604 A1 Feb. 27, 2020

Related U.S. Application Data

(60) Provisional application No. 62/723,092, filed on Aug. 27, 2018.

(51) Int. Cl.
| | |
|---|---|
| *C01B 39/48* | (2006.01) |
| *B01J 20/18* | (2006.01) |
| *B01J 29/70* | (2006.01) |
| *B01J 29/04* | (2006.01) |
| *B01J 29/08* | (2006.01) |
| *B01J 37/10* | (2006.01) |
| *C10G 11/05* | (2006.01) |
| *C10G 25/03* | (2006.01) |
| *C10G 35/095* | (2006.01) |
| *C01B 39/42* | (2006.01) |
| *C01B 39/20* | (2006.01) |

(52) U.S. Cl.
CPC .............. *C01B 39/48* (2013.01); *B01J 20/18* (2013.01); *B01J 29/041* (2013.01); *B01J 29/08* (2013.01); *B01J 29/70* (2013.01); *B01J 29/703* (2013.01); *B01J 29/7007* (2013.01); *B01J 29/7019* (2013.01); *B01J 29/7026* (2013.01); *B01J 29/7034* (2013.01); *B01J 29/7038* (2013.01); *B01J 29/7042* (2013.01); *B01J 29/7046* (2013.01); *B01J 37/10* (2013.01); *C01B 39/205* (2013.01); *C01B 39/42* (2013.01); *C10G 11/05* (2013.01); *C10G 25/03* (2013.01); *C10G 35/095* (2013.01); *C10G 2300/70* (2013.01)

(58) Field of Classification Search
CPC ....... C01B 39/205; C01B 39/42; C01B 39/48; B01J 20/18; B01J 29/041; B01J 29/08; B01J 29/70; B01J 29/7007; B01J 29/7026; B01J 29/703; B01J 29/7034; B01J 29/7038; B01J 29/7042; B01J 29/7046; B01J 29/7019; B01J 37/10
See application file for complete search history.

(56) References Cited

U.S. PATENT DOCUMENTS

| | | | |
|---|---|---|---|
| 4,205,053 A | 5/1980 | Rollmann et al. |
| 4,397,827 A | 8/1983 | Chu |
| 5,063,038 A | 11/1991 | Kirker et al. |
| 5,182,090 A | 1/1993 | Dwyer et al. |
| 5,232,579 A | 8/1993 | Absil et al. |
| 5,785,947 A | 7/1998 | Zones et al. |
| 5,961,951 A | 10/1999 | Kennedy et al. |
| 6,540,970 B1 | 4/2003 | Strohmaier et al. |
| 10,016,747 B2 | 7/2018 | Zhang et al. |
| 2002/0090337 A1 | 7/2002 | Corma Canos et al. |
| 2007/0191658 A1 | 8/2007 | Lai |
| 2012/0202006 A1 | 8/2012 | Rimer |
| 2016/0121315 A1 | 5/2016 | Zhang et al. |
| 2016/0122193 A1 | 5/2016 | Lai et al. |
| 2017/0175011 A1 | 6/2017 | McCarthy et al. |

FOREIGN PATENT DOCUMENTS

| | | |
|---|---|---|
| CN | 103301877 A | 9/2013 |
| CN | 103232044 B | 4/2015 |
| CN | 105016354 A | 11/2015 |
| EP | 0026962 A1 | 4/1981 |
| EP | 0197775 A2 | 10/1986 |
| WO | 9222498 A1 | 12/1992 |

(Continued)

OTHER PUBLICATIONS

Casoni et a, "Catqalytic pyrolysis of cellulose using MCM-41 type catalysts" Applied Catalysis A: General, vol. 514, Mar. 2016, pp. 235-240 (Year: 2016).*

Shaikh et al, "H-ZSM-5 Zeolite Synthesis by Sourcing Silica from the Wheat Husk Ash: Characterization and Application as a Versatile Heterogeneous Catalyst in Organic Transformations including Some Multicomponent Reactions", Journal of Catalysts, Article ID 805714 | https://doi.org/10.1155/2015/805714 (Year: 2015).*

(Continued)

*Primary Examiner* — David M Brunsman

(57) ABSTRACT

Processes are provided for preparing molecular sieves for use as catalysts. The process involves preparing a synthesis mixture for the molecular sieve wherein the synthesis mixture includes a morphology modifier which may be selected from cationic surfactants having a single quaternary ammonium group comprising at least one hydrocarbyl group having at least 12 carbon atoms, nonionic surfactants, anionic surfactants, sugars, and combinations thereof.

7 Claims, No Drawings

(56) References Cited

FOREIGN PATENT DOCUMENTS

| WO | 9629284 A1 | 9/1996 |
|---|---|---|
| WO | 2010/077352 A1 | 7/2010 |

OTHER PUBLICATIONS

Song et al. "Synthesis and characterization of strong acidic mesoporous alumino-silicates constructed of zeolite MCM-22 precursors", Catalysis Communications, vol. 10, Issue 5, Jan. 2009, pp. 631-634 (Year: 2009).*

Xu et al, "Self-Assembly of Cetyltrimethylammonium Bromide and Lamellar Zeolite Precursor for the Preparation of Hierarchical MWW Zeolite", Chem. Mater. 2016, 28, 4512-4521 (Year: 2016).*

Zhou et al, "Enhanced Surface Activity of MWW Zeolite Nanosheets Prepared via a One-Step Synthesis": J. Am. Chem. Soc. 2020, 142, 8211-8222 (Year: 2020).*

Margarit et al, "Direct Dual-Template Synthesis of MWW Zeolite Monolayers", Angew.Chem. Int.Ed. 2015, 54, 13724-13728 (Year: 2015).*

Li et al, "Strategies to control zeolite particle morphology" Chem. Soc. Rev., 2019, 48, 885 (Year: 2019).*

Okamoto et al, "Synthesis of Short, Needle-Shaped Crystals of TON-Type Zeolite by Addition of Inhibitors of Crystal Growth along the [001] Direction", Cryst. Growth Des. 2018, 18, 11, 6573-6580 (Year: 2018).*

Gao Ningning, et al. "Development of hierarchical MCM-40 zeolite with intracrystalline mesopores and improved catalytic performance in liquid alkylation of benzene with ethylene", Microporous and Mesoporous Materials, vol. 212, Mar. 18, 2015, pp. 1-7.

Lupulescu et al., "A facile strategy to design zeolite L crystals with tunable morphology and surface architecture", J. Am. Chem. Soc. 2013, 135, 6608-6617.

Kumar et al., "SSZ-13 crystallization by particle attachment and deterministic pathways to crystal size control", J. Am. Chem. Soc. 2015, 137, 13007-13017.

Blasco et al., "Changing the Si distribution in SAPO-11 by synthesis with surfactants improves the hydroisomerization/dewaxing properties", J. Catalysis, 2006, 242, 153-161.

Kim et al., "n-Heptane hydroisomerization over Pt/MFI zeolite nanosheets: Effects of zeolite crystal thickness and platinum location", J. Catalysis, 2013, 301, 187-197.

Charnell, "Gel growth of large crystals of sodium A and sodium X zeolites", J. Crystal Growth, 1971, 8, 291-294.

Chauhan et al., "Synthesis of zeolite ZSM-5: Effect of emulsifiers", Cryst. Res. Tech. 2012, 7, 746-753.

Axnanda et al., "Cationic microemulsion-mediated synthesis of silicalite-1", Microporous and Mesoporous Mater. 2005, 84, 236-246.

Lee et al., "Modifying zeolite particle morphology and size using water/oil/surfactant mixtures as confined domains for zeolite growth", Chem Commun 2004, 680-681.

Carr et al., "Non-ionic-microemulsion mediated growth of zeolite A", Microporous and Mesoporous Mater. 2005, 85, 284-292.

Kim et al., "External Surface Catalytic Sites of Surfactant-Tailored Nanomorphic Zeolites for Benzene Isopropylation to Cumene", ACS Catalysis 2013, 3, 192-195.

Chauhan et al., "Synthesis of small-sized ZSM-5 zeolites employing mixed structure directing agents", Materials Letters 2012, 74, 115-117.

Moteki et al., "From charge density mismatch to a simplified, more efficient seed-assisted synthesis of UZM-4", Chemistry of Materials 2013, 25, 2603-2609.

Mohamed et al., "Synthesis of ZSM-5 zeolite of improved bulk and surface properties via mixed templates", J. Mater. Sci. 2007, 42, 4066-4075.

Wu et al., "Mesoporous SSZ-13 zeolite prepared by a dual-template method with improved performance in the methanol-to-olefins reaction", J. Catalysis 2013, 298, 27-40.

Berger et al., "The synthesis of large crystals of zeolite Y re-visited", Microporous and Mesoporous Materials 2005, 83, 333-344.

Yu et al., "Studies on the dual-templating function of TBA for the formation of ZSM-11 intergrowth morphology", Ind. Eng.Chem. Res. 2015, 54, 2120-2128.

Zhu et al., "Highly mesoporous single-crystalline zeolite beta synthesized using a nonsurfactant cationic polymer as a dual-function template", J. Am. Chem. Soc. 2014, 136, 2503-2510.

Lupulescu et al., "Employing molecular modifiers to tailor the crystal morphology of zeolite catalysts", 2012 AICHe Annual Meeting Conference Proceedings, Pittsburgh, 2012. American Institute of Chemical Engineers.

* cited by examiner

PROCESS FOR MAKING MOLECULAR SIEVES

CROSS-REFERENCE TO RELATED APPLICATIONS

This application claims the benefit of U.S. Provisional Application No. 62/723,092, filed on Aug. 27, 2018, the entire contents of which are incorporated herein by reference.

FIELD

This invention relates to a novel process for making crystals of a molecular sieve, to a molecular sieve made by the process, and its use as adsorbent and/or hydrocarbon conversion catalyst.

BACKGROUND

Molecular sieve materials, both natural and synthetic, have been demonstrated in the past to be useful as adsorbents and to have catalytic properties for various types of hydrocarbon conversion reactions. Certain molecular sieves are ordered, porous crystalline materials having a definite crystalline structure as determined by X-ray diffraction (XRD). Certain molecular sieves such as MCM-41 are ordered and produce specific identifiable X-ray diffraction patterns, but are not strictly crystalline. Within the molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of positive ion-containing crystalline silicates. These silicates can be described as three-dimensional framework of $SiO_4$ and Periodic Table Group 13 element oxide (e.g., $AlO_4$). The tetrahedra are typically corner-shared through oxygen atoms with the electrovalence of the tetrahedra containing the Group 13 element (e.g., aluminum, gallium or boron) being charged balanced by the inclusion of a cation, for example a proton, an alkali metal or an alkaline earth metal cation.

Molecular sieves that find application in catalysis include any of the naturally occurring or synthetic crystalline molecular sieves. Examples of these molecular sieves include large pore zeolites, intermediate pore size zeolites, and small pore zeolites. These zeolites and their isotypes are described in "Atlas of Zeolite Framework Types", eds. Ch. Baerlocher, L. B. McCusker, D. H. Olson, Elsevier, Sixth Revised Edition, 2007, and in the online Database of Zeolite Structures http://www.iza-structure.org/databases/ which are hereby incorporated by reference. A large pore zeolite generally has a pore size of at least about 6.5 to 7 Angstroms and includes LTL, MAZ, FAU, OFF, *BEA, and MOR framework type zeolites (IUPAC Commission of Zeolite Nomenclature). Examples of large pore zeolites include mazzite, offretite, zeolite L, zeolite Y, zeolite X, omega, and beta. An intermediate pore size zeolite generally has a pore size from about 4.5 Angstroms to less than about 7 Angstroms and includes, for example, MFI, MEL, EUO, MTT, MFS, AEL, AFO, HEU, FER, MWW, and TON framework type zeolites (IUPAC Commission of Zeolite Nomenclature). Examples of intermediate pore size zeolites include ZSM-5, ZSM-11, ZSM-22, MCM-22, silicalite 1, and silicalite 2. A small pore size zeolite has a pore size from about 3 Angstroms to less than about 5.0 Angstroms and includes, for example, CHA, ERI, KFI, LEV, SOD, and LTA framework type zeolites (IUPAC Commission of Zeolite Nomenclature). Examples of small pore zeolites include ZK-4, SAPO-34, SAPO-35, ZK-14, SAPO-42, ZK-21, ZK-22, ZK-5, ZK-20, zeolite A, chabazite, zeolite T, and ALPO-17.

While many molecular sieves, in particular zeolites, have become established commercially as adsorbents and catalysts there remains a need for improved molecular sieves, for example, as catalysts having improved activity and/or selectivity. One aspect which has received much attention recently is the crystal size of the molecular sieve. Other things being equal, a molecular sieve having a reduced crystal size will generally have an increased external surface area which may lead to increased catalytic activity through increasing the rate of adsorption onto the surface of the molecular sieve crystals and/or by reducing the length of the diffusion pathway to the interior pores of the crystal. Reducing the crystal size of a molecular sieve catalyst may also promote reactions which occur principally on the external surface of the zeolite, for example, reactions involving larger reactant molecules which, due to their size, are slow to diffuse into the interior pores.

SUMMARY

The invention provides a process of preparing crystals of a molecular sieve, the process comprising the steps of:

combining at least a source of a tetravalent element X, a morphology modifier L, and water to form a synthesis mixture;

heating said synthesis mixture under crystallization conditions for a time of about 1 hour to 100 days to form the crystals of the molecular sieve; and recovering said crystals of the molecular sieve from the synthesis mixture;

wherein the morphology modifier L is selected from the group consisting of cationic surfactants having a single quaternary ammonium group comprising at least one C12 or larger hydrocarbyl group, nonionic surfactants, anionic surfactants, sugars and combinations thereof, and is present in the synthesis mixture before nucleation or crystallization of the crystals begins;

wherein if the molecular sieve is one which requires a structure directing agent Q, the morphology modifier L is different from and is present in addition to the structure directing agent Q; wherein the molar ratio L:X in the synthesis mixture is in the range of from 0.0001 to 0.03; and wherein the synthesis mixture is liquid or a mixture of solid and liquid, wherein the liquid is substantially a single phase.

Optionally, the synthesis mixture also comprises of a source of hydroxide ions. Optionally, the synthesis mixture also comprises a structure directing agent Q. Optionally, the synthesis mixture also comprises a source of a trivalent element Y. Optionally, the synthesis mixture also comprises a source of a pentavalent element Z. Optionally, the synthesis mixture also comprises a source of halide ions Optionally, the synthesis mixture also comprises a source of alkali metal ions $M^+$ and/or alkaline earth metal cations $M^{2+}$. Optionally, the synthesis mixture also comprises one or more other components.

The expression "the liquid is substantially a single phase" should be understood as meaning the liquid phase comprises less than 5 wt % of water insoluble liquid components. In particular, the liquid phase is not an emulsion or a micremulsion.

The inventors have found that by conducting the synthesis of the molecular sieve in the presence of the morphology modifier L it is possible to influence the crystal growth such that the crystals of molecular sieve have modified crystal sizes and/or modified acidity, as compared to the crystals of the same molecular sieve prepared in the absence of the morphology modifier L. This allows for the production of molecular sieve crystals with novel and desirable properties. The molecular sieve crystals produced by the process of the invention may be smaller than crystals of the same molecular sieve prepared by the same process but in the absence of the morphology modifier L. Without wishing to be bound by theory, the inventors believe that the presence of the morphology modifier L may either change the distribution of trivalent elements such as Al in the crystals and/or change the way in which the crystal terminates such that access to the trivalent element such as Al is enhanced. The molecular sieve crystals produced by the process of the invention may have increased surface area, especially external surface area, as compared to crystals of the same molecular sieve prepared by the same process but in the absence of the morphology modifier L. The molecular sieve crystals produced by the process of the invention may have a greater external surface acidity, as measured for example by collidine adsorption, than crystals of the same molecular sieve prepared by the same process but in the absence of the morphology modifier L. Decreased crystal size and/or increased external surface area and/or increased external acidity can lead to an increase in activity and/or an increase in selectivity of the molecular sieve when used as a component in a catalyst, for example in a hydrocarbon conversion reaction.

The process is generally applicable to molecular sieves and is not limited to any particular molecular sieve or sub-group of molecular sieves. The term "molecular sieve" as used herein should be understood as including materials such as MCM-41 which are ordered and have identifiable X-ray diffraction patterns but which are not strictly crystalline. Preferably, the molecular sieve does have a crystalline framework structure.

The invention also provides a molecular sieve prepared by the process of the invention in its as-made form. The invention further provides a molecular sieve prepared by the process of the invention in its calcined form.

The invention further provides a catalyst comprising the molecular sieve of the invention.

The invention further provides a hydrocarbon conversion process comprising the step of contacting a hydrocarbon feedstock with a catalyst of the invention.

DETAILED DESCRIPTION

The process of making a molecular sieve according to the invention involves preparing a synthesis mixture according to conventional techniques except that the synthesis mixture also contains a morphology modifier L. Without wishing to be bound by any theory, it is believed that the morphology modifier L may bind to or otherwise interact with the growing surfaces of crystallites within the synthesis mixture and thereby influence the morphology, including the size, aspect ratio, and agglomeration/aggregation of the final product crystals. Depending on the nature of the morphology modifier L and the concentration used the product crystals may be smaller or larger than those which would otherwise be obtained using the same synthesis mixture without the morphology modifier L under the same conditions.

The Synthesis Mixture

As mentioned above, the synthesis mixture can be prepared according to conventional methods. The morphology modifier L may be included in the synthesis mixture at any time before nucleation or crystallization of the crystals starts. Optionally, the morphology modifier L is combined with other components of the synthesis mixture before the source of the tetravalent element X is added. For example, the water, the source of hydroxide ion (if present), the structure directing agent (if present), the source of a trivalent element Y (if present), the seeds (if present) and any other components can be combined in any order to form a mixture and then and then the source of the tetravalent element is combined with that mixture.

Optionally the molecular sieve is one in which the framework contains one or more elements selected from the group consisting of Si, Al, P, As, Ti, Ge, Sn, Fe, B, Ga, Be and Zn and mixtures thereof. The tetravalent element X is optionally selected from the group consisting of Si, Ge, Sn and Ti and mixtures thereof. Preferably, the tetravalent element X is Si. Where X=Si, suitable sources of silicon (Si) that can be used to prepare the synthesis mixture include silica; colloidal suspensions of silica, for Ludox®; precipitated silica; alkali metal silicates such as potassium silicate and sodium silicate; tetraalkyl orthosilicates; and fumed silicas such as Aerosil and Cabosil.

The synthesis mixture also contains a source of hydroxide ions, for example, the synthesis mixture may comprise an alkali metal hydroxide such as sodium hydroxide or potassium hydroxide. Hydroxide can also be present as the anion of any charged (organic) structure directing agent or morphology modifier which may be present or by the use of sodium aluminate or potassium aluminate as a source of Y, or by the use of sodium silicate or potassium silicate as the source of X. Sodium or potassium aluminate and silicate can also be used as the source of alkali metal $M^+$.

Optionally, the trivalent element Y is selected from the group consisting of Al, B, Fe and Ga and mixtures thereof. Optionally, Y is selected from B, Ga or Al, or mixtures thereof. Preferably, the trivalent element Y is Al. Suitable sources of trivalent element Y that can be used to prepare the synthesis mixture depend on the element Y that is selected (e.g., boron, aluminum, iron and gallium). In embodiments where Y is boron, sources of boron include boric acid, sodium tetraborate and potassium tetraborate. Optionally, the trivalent element Y is aluminum, and the aluminum source includes aluminum sulfate, aluminum nitrate, aluminum hydroxide, hydrated alumina, such as boehmite, gibbsite, and pseudoboehmite, and mixtures thereof. Other aluminum sources include, but are not limited to, other water-soluble aluminum salts, alkali metal aluminate solids or liquids, aluminum alkoxides, such as aluminum isopropoxide, or aluminum metal, such as aluminum in the form of chips or powders.

Alternatively or in addition to previously mentioned sources of Si and Al, sources containing both Si and Al elements can also be used as sources of Si and Al. Examples of suitable sources containing both Si and Al elements include amorphous silica-alumina gels or dried silica alumina powders, silica aluminas, clays, such as kaolin, metakaolin, and zeolites, in particular aluminosilicates such as synthetic faujasite and ultrastable faujasite, for instance USY, beta or other large to medium pore zeolites. Optionally, the pentavalent element Z, if present, is selected from the group consisting of P and As, and mixtures thereof. Preferably, Z, if present, is P. Suitable sources of phosphorus include one or more sources selected from the group consisting of phosphoric acid; organic phosphates, such as triethyl phosphate, tetraethyl-ammonium phosphate; aluminophosphates; phosphate salts such as alkali metal phosphates, dihydrogen phosphates, hydrogen phosphates and pyrophosphates, and mixtures thereof.

Optionally, the halide ion W−, if present, is selected from the group consisting of chloride, bromide, fluoride and mixtures thereof. The source of halide ions may be any compound capable of releasing halide ions in the molecular sieve synthesis mixture. Non-limiting examples of sources of halide ions include salts containing one or several halide ions, such as metal halides, preferably where the metal is sodium, potassium, calcium, magnesium, strontium or barium. Suitable sources of fluoride ion, F−, include HF; ammonium fluoride or tetraalkylammonium fluorides such as tetramethylammonium fluoride or tetraethylammonium fluoride; fluoride-containing salts such as NaF, and KF; compounds of fluoride with the elements X, Y such as $AlF_3$ and $SiF_6$ salts; and/or compounds in which the fluoride ion is present as counterion for a cationic structure directing agent, Q. If the synthesis mixture does not comprise a source of hydroxide ion, then it preferably contains a source of fluoride ion, which can also act as a mineralizing agent. A convenient source of halide ion is HF.

Optionally, the synthesis mixture also contains a source of alkali metal cations $M^+$ and/or alkaline earth metal cations $M^{2+}$. If present, the alkali metal cation $M^+$ is preferably selected from the group consisting of $Li^+$, $Na^+$, $K^+$, $Rb^+$ and $Cs^+$ and mixtures thereof. Suitable sources of $Na^+$ include may be a sodium salts such as NaCl, NaBr, NaF, or $NaNO_3$; sodium hydroxide, sodium aluminate and mixtures thereof. Suitable sources of $K^+$ include potassium hydroxide, potassium halides such as KCl, KF or NaBr, potassium nitrate and mixtures thereof. If present, the alkaline earth metal cation is preferably selected from $Mg^{2+}$, $Ca^{2+}$, $Sr^{2+}$, $Ba^{2+}$ and mixtures thereof.

Structure directing agents, Q, are compounds which are known to influence the crystallization of the framework of the molecular sieve so as to promote the formation of a particular desired molecular sieve. For example, tetrapropylammonium hydroxide or bromide is often used to make ZSM-5. In contrast, the role of the morphology modifier, L, is to influence the crystallization to modify the crystal size, the external surface area and/or the external acidity of the molecular sieve as described above, rather than the to influence the identity of the molecular sieve. Where the molecular sieve is one which requires the use of a structure directing agent Q the synthesis mixture will also comprise an effective concentration of the structure directing agent. In that case, the morphology modifier L will be different from and will be present in addition to the structure directing agent Q. The nature of the structure directing agent Q will depend upon the desired framework type. Many such structure directing agents are known to the skilled person. The structure directing agent Q may be present in any suitable form, for example as a salt of a halide such as a chloride or bromide, as a hydroxide or as a nitrate. The structure directing agent Q will generally be an organic structure directing agent, for example, an amine such a propylamine, pyrrolidine or pyridine or a nitrogen-containing cation such as a quarternary ammonium cation. Optionally, the ammonium cation does not include any alkyl chain having more than 10 carbon atoms. For example, the structure directing agent Q may optionally be N,N,N-trimethyl-1-adamantammonium hydroxide (TMAdA) where it is desired to produce a zeolite of framework type CHA.

The synthesis mixture can have any composition which is suitable for preparing the desired molecular sieve framework. The following ranges are given as examples of desirable and preferred ranges for each pair of components in the synthesis mixture. Conveniently, the molar ratio of $XO_2:Y_2O_3$ in the synthesis mixture may be in the range of from 2 to infinity (i.e. no Y), in particular from 5 to 500, preferably from 5 to 200. Optionally, in the synthesis mixture the molar ratio of structure directing agent Q:($XO_2$+$Y_2O_3$+$Z_2O_5$) is in the range of from 0.01 to 1.0, preferably from 0.02 to 0.9. Optionally, in the synthesis mixture the molar ratio of $H_2O$:($XO_2$+$Y_2O_3$+$Z_2O_5$) is in the range of from 5 to 100. Optionally, in the synthesis mixture the molar ratio of $M^+$:($XO_2$+$Y_2O_3$+$Z_2O_5$) is in the range of from 0 to 1.2, preferably from 0 to 1.0. Optionally, in the synthesis mixture the molar ratio of $OH^-$:($XO_2$+$Y_2O_3$+$Z_2O_5$) is in the range of from 0.05 to 1.1, preferably from 0.10 to 1.0. Optionally, in the synthesis mixture the molar ratio of $halide^-$:($XO_2$+$Y_2O_3$+$Z_2O_5$) is in the range of from 0 to 1, preferably from 0 to 0.5. The reaction mixture may for example have a composition, expressed in terms of mole ratios, as indicated in the following Table:

| Mole ratio | Useful | Preferred |
| --- | --- | --- |
| $XO_2/Y_2O_3$ | 5 to 500 | 5 to 200 |
| $Q/(XO_2 + Y_2O_3 + Z_2O_5)$ | 0.00 to 1.0 | 0.02 to 0.9 |
| $H_2O/(XO_2 + Y_2O_3 + Z_2O_5)$ | 5 to 100 | 5 to 100 |
| $M^+/(XO_2 + Y_2O_3 + Z_2O_5)$ | 0 to 1.20 | 0 to 1.00 |
| $OH^-/(XO_2 + Y_2O_3 + Z_2O_5)$ | 0.05 to 1.1 | 0.10 to 1.0 |
| $Halide^-/(XO_2 + Y_2O_3 + Z_2O_5)$ | 0 to 1 | 0 to 0.5 |

The water may be added in any amount suitable to dissolve the components and to prepare the desired molecular sieve. The synthesis mixture will comprise an aqueous liquid phase and may also comprise some undissolved solid components as well as crystallised molecular sieve. The liquid present in the synthesis mixture is substantially a single phase, typically an aqueous solution, gel phase, slurry, paste or moist powder. The liquid present in the synthesis mixture typically comprises less than 5 wt %, optionally less than 2 wt %, optionally less than 1 wt % of water-insoluble liquid components. In particular, the liquid present in the synthesis mixture is not an emulsion or a microemulsion. The synthesis may be performed with or without added nucleating seeds. If nucleating seeds are added to the synthesis mixture, the seeds are suitably present in an amount from about 0.01 to 10.0% by weight, based on the synthesis mixture, such as from about 0.01 to 2.0% by weight of the synthesis mixture. The seeds can for instance be of any suitable zeolite, which may be a zeolite having the same or a different framework as the zeolite to be obtained.

The Morphology Modifier L

The morphology modifier L is selected from the group consisting of cationic surfactants having a single quaternary ammonium group comprising at least one hydrocarbyl, preferably alkyl, group having at least 12 carbon atoms, nonionic surfactants, anionic surfactants, sugars, and combinations thereof, and is added to the other components of the synthesis mixture before nucleation or crystallization of the crystals begins. Mixtures of two or more morphology modifiers L may also be used and such processes are within the scope of the invention.

The morphology modifier may be a sugar. The sugar may be a monosaccharide or a disaccharide. Suitable monosaccharides include glucose, fructose and galactose, especially fructose. Suitable disaccharides include sucrose, maltose and lactose. The sugar may be a pentose. Alternatively, the sugar may be a hexose.

The morphology modifier L may be a cationic surfactant having a single quaternary ammonium group comprising at least one hydrocarbyl having at least 12 carbon atoms. The at least one hydrocarbyl having at least 12 carbon atoms is covalently bound to the nitrogen atom of the quaternary ammonium, and may be branched or linear, preferably linear. The at least one hydrocarbyl optionally has at least 14 carbons atoms, optionally at least 16 carbon atoms, optionally at least 18 carbon atoms. Optionally, the at least one hydrocarbyl has no more than 30 carbon atoms. The hydrocarbyl may include aromatic groups such as phenyl. The hydrocarbyl may be saturated or unsaturated, preferably saturated. The cationic surfactant may comprise two hydrocarbyls each having at least 12 carbon atoms bound to the nitrogen atom of the quaternary ammonium group. The other substituents on the nitrogen atom of the quaternary ammonium group are optionally alkyl having from 1 to 8 carbon atoms, optionally from 1 to 4 carbon atoms, such as methyl groups. Each hydrocarbyl may include one or more heteroatoms, optionally selected from selected from oxygen, sulphur, nitrogen and halide.

The morphology modifier L may be a cationic surfactant having a single quaternary ammonium group comprising at least one alkyl having at least 12 carbon atoms. The at least one alkyl having at least 12 carbon atoms is covalently bound to the nitrogen atom of the quaternary ammonium, and may be branched or linear, preferably linear. The at least one alkyl optionally has at least 14 carbons atoms, optionally at least 16 carbon atoms, optionally at least 18 carbon atoms. Optionally, the at least one alkyl has no more than 30 carbon atoms. The alkyl may be saturated or unsaturated, preferably saturated. The cationic surfactant may comprise two alkyls each having at least 12 carbon atoms bound to the nitrogen atom of the quaternary ammonium group. The other substituents on the nitrogen atom of the quaternary ammonium group are optionally alkyl having from 1 to 8 carbon atoms, optionally from 1 to 4 carbon atoms, such as methyl groups.

The cationic surfactant comprises only a single (that is, no more than one) quaternary ammonium group.

The cationic surfactant may include any suitable anion, such as hydroxide or halide as counterion. $OH^-$, $F^-$, $Cl^-$ and $Br^-$ are preferred counterions.

The morphology modifier L is optionally a cationic surfactant having the formula (1)

$$(R^1)_q(R^2)_{4-q}N^+(X^{n-})_{1/n} \qquad (1)$$

wherein each $R^1$ is independently a $C_1$-$C_6$, optionally a $C_1$ to $C_4$, hydrocarbyl group which may be linear or branched, saturated or unsaturated, preferably linear and saturated and each hydrocarbyl may include one or more heteroatoms, optionally selected from selected from oxygen, sulphur, nitrogen and halide; $R^2$ is a $C_{12}$ to $C_{30}$, optionally $C_{14}$ to $C_{30}$, optionally $C_{16}$ to $C_{30}$, optionally $C_{18}$ to $C_{30}$ hydrocarbyl which may be branched or linear, saturated or unsaturated, preferably linear and saturated, and each hydrocarbyl may include one or more aromatic or aliphatic cyclic groups, and/or one or more heteroatoms, optionally selected from selected from oxygen, sulphur, nitrogen and halide; q is 1 or 2, preferably 1; $X^{n-}$ is an anion of valency n. n is preferably 1. $X^{n-}$ is optionally a hydroxide anion or a halide anion, especially a halide anion selected from fluoride, chloride or bromide. $R^1$ is optionally methyl.

Preferably each $R^1$ is independently a $C_1$-$C_6$, optionally a $C_1$ to $C_4$, alkyl group which may be linear or branched, saturated or unsaturated, preferably linear and saturated. Preferably $R^2$ is a $C_{12}$ to $C_{30}$, optionally $C_{14}$ to $C_{30}$, optionally $C_{16}$ to $C_{30}$, optionally $C_{18}$ to $C_{30}$ alkyl group which may be branched or linear, saturated or unsaturated, preferably linear and saturated.

Optionally, the morphology modifier L is a cationic surfactant having the formula (2)

$$(R^3)_3R^4N^+A^- \qquad (2)$$

in which $A^-$ is an anion, preferably hydroxide or halide, and is preferably selected from $OH^-$, $Cl^-$ and $Br^-$, each $R^3$ is independently selected from hydrogen and $C_1$ to $C_4$ alkyl, preferably methyl, and $R^4$ is a $C_{12}$ to $C_{30}$ alkyl group, preferably a $C_{14}$ to $C_{20}$ alkyl group, which may be branched or linear, and be saturated or unsaturated, and optionally contains one or more cyclic groups, and is preferably saturated and linear.

Suitable cationic surfactants include dodecyltrimethylammonium chloride, dodecyltrimethylammonium bromide, hexadecyltrimethylammonium chloride, hexadecyltrimethylammonium bromide, octadecyltrimethylammonium chloride, octadecyltrimethylammonium bromide, hexadecylethyldimethylammonium chloride, and hexadecylethyldimethylammonium bromide.

The cationic surfactant has only a single quaternary ammonium group and so compounds having two quaternary ammonium groups (the so-called "diquaternary ammoniums") or higher numbers of quaternary ammonium groups are not morphology modifiers as defined herein.

The morphology modifier L may be a nonionic surfactant. Optionally, the nonionic surfactant is selected from the group consisting of alkyl ethoxylates, alkyl propoxylates, alkylphenol ethoxylates, alkylphenol propoxylates, fatty acid ethoxylates, fatty acid propoxylates, ethoxylated amines, propoxylated amines, ethoxylated amides, propoxylated amides, block copolymers of ethylene oxide and propylene oxide, block copolymers of ethylene oxide and butylene oxide, and fatty acid esters of polyhydroxy compounds such as glycerol and sorbitan. For example, the morphology modifier L may be PEG-dodecyl ether or PEG oleyl ether. The morphology modifier may be a block copolymer, for example, a block copolymer comprising ethylene oxide blocks and propylene oxide blocks, such as an EO-PO-EO block copolymer. The morphology modifier L may be an anionic surfactant. Anionic surfactants comprise an anionic group such as a sulfate, sulfonate, phosphate or carboxylate group, and an alkyl group having at least 8 carbon atoms, optionally at least 10 carbon atoms, optionally at least 12 carbon atoms for example from 14 to 30 carbon atoms, Optionally, the anionic surfactant is an alkyl sulphate, an alkyl sulfonate, an alkyl phosphate or an alkyl carboxylate. Optionally, the anionic surfactant is an alkyl sulfate such as a $C_8$ to $C_{30}$ alkyl sulphate, for example, sodium lauryl sulfate.

The molar ratio L:X in the synthesis mixture is in the range of from 0.0001 to 0.03, optionally from 0.001 to 0.025. At lower ratios the concentration of morphology modifier L may be insufficient to cause noticeable change in the morphology of the crystals whereas at higher ratios the concentration of the morphology modifier may be so large as to either inhibit the crystallization so as to significantly reduce the rate of crystallization or to cause another molecular sieve framework to be formed in place of the desired one.

The morphology modifier L is optionally present in the synthesis mixture in a concentration in the range of from 0.1 to 10 wt %, optionally 0.1 wt % to 5 wt %, optionally from 0.2 wt % to 3 wt %, preferably from 0.5 wt % to 2 wt %, based on the weight of the synthesis mixture.

The Crystallization and Recovery

Crystallization can be carried out under either static or stirred conditions in a suitable reactor vessel, such as for example, polypropylene jars or Teflon® bottles, acid digestion vessels, Teflon® lined or stainless steel autoclaves, plough shear mixers, or reaction kettles. The crystallization is typically carried out at a temperature of about 80° C. to about 250° C., optionally 100° C. to about 200° C., optionally about 150° C. to about 170° C., for a time sufficient for crystallization to occur at the temperature used, e.g., from about 1 day to about 100 days, in particular from 1 to 50 days, for example from about 2 days to about 40 days. Thereafter, the synthesized crystals are separated from the mother liquor by any convenient method such as filtration or centrifugation and recovered. Crystals are then dried, for example, under atmospheric conditions, washed with low boiling solvents such as acetone, methanol, ethanol, or propanol, microwave conditions, or dried in an oven at temperatures of up to 150° C.

Calcination

The process optionally includes the step of calcining the crystals recovered in step c) to give the calcined form of the molecular sieve. The conditions of calcination will be chosen to at least partially eliminate any organic residues remaining, such as remaining morphology modifier L and/or any structure directing agent Q (if used) which is typically trapped in the pores of the molecular sieve in its "as-made" form.

The calcining step typically involves heating the zeolite at a temperature of at least about 200° C., preferably at least about 300° C., more preferably at least about 370° C. for at least 1 minute and generally not longer than 20 hours. While subatmospheric pressure can be employed for the thermal treatment, atmospheric pressure is usually desired for reasons of convenience. The thermal treatment can be performed at a temperature up to about 925° C. For instance, the thermal treatment can be conducted at a temperature of from 400 to 600° C., for instance from 500 to 550° C., in the presence of an oxygen-containing gas, for example, in air.

The molecular sieve may also be subjected to an ion-exchange treatment, for example, with aqueous ammonium salts, such as ammonium nitrate, ammonium chloride and ammonium acetate, in order to remove remaining alkali metal cations and/or alkaline earth metal cations and to replace them with protons thereby producing the acid form of the molecular sieve. To the extent desired, the original cations of the as-synthesized material, such as alkali metal cations, can be replaced by ion exchange with other cations. Preferred replacing cations can include metal ions, hydrogen ions, hydrogen precursor, e.g., ammonium ions and mixtures thereof. Particularly preferred cations can be those which tailor the catalytic activity for certain hydrocarbon conversion reactions. These can include hydrogen, rare earth metals and metals of Groups IIA, IIIA, IVA, VA, IB, IIB, IIIB, IVB, VB, VIB, VIIB and VIII of the Periodic Table of the Elements. The ion exchange step may take place after the as made molecular sieve is dried. The ion-exchange step may take place either before or after a calcination step.

The molecular sieve may also be subjected to other treatments such as steaming and/or washing with solvent. Such treatments are well-known to the skilled person and are carried out in order to modify the properties of the molecular sieve as desired.

The Molecular Sieve

The molecular sieve of the invention may be of any type. The molecular sieve may be, for example, selected from the group consisting of silicates, aluminosilicates, borosilicates, gallosilicates, titanosilicates, germanosilicates, zincosilicates, aluminophosphates (ALPOs), silicoaluminophosphates (SAPOs) and mixed oxide frameworks (MOFs); preferably from silicates, aluminosilicates, aluminophosphates (ALPOs), and silicoaluminophosphates (SAPOs); more preferably from silicates and aluminosilicates.

The molecular sieve of the invention may optionally be a crystalline aluminophosphate or silicoaluminophosphate. Aluminophosphate molecular sieves are porous frameworks containing alternating aluminum and phosphorous tetrahedral atoms connected by bridging oxygen atoms. In the case of silicoaluminophosphate molecular sieves, some of the phosphorous, or pairs of aluminum and phosphorous atoms can be substituted with tetrahedral silicon atoms. Those materials may be represented by the formula, on an anhydrous basis:

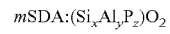

$m$SDA:(Si$_x$Al$_y$P$_z$)O$_2$ m in the number of moles of SDA per mole of (Si$_x$Al$_y$P$_z$)O$_2$ and m has a value in the as-synthesized form from 0.01 to 0.5, preferably from 0.04 to 0.35; x, y, and z respectively represent the mole fraction of Si, Al and P as tetrahedral oxides, where x+y+z=1, and y and z are greater than or equal to 0.25. Preferably, x is greater than 0 in the case of silicoaluminophosphate molecular sieves and optionally, x is in the range of from greater than 0 to about 0.31. The range of y is from 0.25 to 0.5, and z is in the range of from 0.25 to 0.5 and preferably y and z are in the range 0.4 to 0.5.

Preferably, the molecular sieve is a zeolite. The zeolite may be a small pore size zeolite. The zeolite may be a medium pore size zeolite. The zeolite may be a large pore size zeolite. The molecular sieve may be a molecular sieve having a framework code selected from the group consisting of MRE, MWW, MTW, FAU, EMT, MFS, MEI, BEA and its polymorphs, TON and MTT. The molecular sieve may be a zeolite selected from the group consisting of ZSM-48, zeolites having the MWW framework, ZSM-12, cubic faujasite, hexagonal faujasite, ZSM-57, ZSM-18, beta, ZSM-22 and ZSM-23. Optionally, the molecular sieve is a zeolite selected from the group consisting of ZSM-48, MCM-49, ZSM-12, cubic faujasite, hexagonal faujasite, ZSM-57, ZSM-18, beta, ZSM-22 and ZSM-23.

The molecular sieve made by the process of the invention may have an increased external surface area as compared to the same molecular sieve made in the absence of the morphology modifier L. Optionally, the molecular sieve made by the process of the invention has an external surface area of at least 1.1 times, optionally at least 1.2 times the external surface area of the same molecular sieve made in the absence of the morphology modifier L.

The molecular sieve made by the process of the invention may have an increased external acidity, as measured by collidine absorption, as compared to the same molecular sieve made in the absence of the morphology modifier L. Optionally, the molecular sieve made by the process of the invention has an external acidity of at least 1.1 times, optionally at least 1.2, times the external acidity of the same molecular sieve made in the absence of the morphology modifier L.

Alternatively, the molecular sieve made by the process of the present invention has a reduced external surface area and/or a reduced external acidity as compared to the same molecular sieve made in the absence of the morphology modifier L.

By selecting the appropriate morphology modifier L and an appropriate concentration of that morphology modifier the skilled person can prepare molecular sieves having a range of external surface area, external acidity and/or crystal size.

The molecular sieve of the invention preferably has a ratio of external surface area to internal surface area of greater than 1.20 and/or has a ratio of external acidity, as measured by collidine absorption, to internal acidity, as measured by ammonia absorption, of greater than 1.50.

In some aspects, the molecular sieve made by the process described herein in either a calcined or as-synthesized form can form agglomerates of small crystals that may have crystal sizes in the range of 0.01 to 1 µm. These small crystals can be desirable for they generally lead to greater activity. Smaller crystals can mean greater surface area which leads to a greater number of active catalytic sites per given amount of catalyst.

Optionally the zeolite contains Si and Al and has a $SiO_2:Al_2O_3$ molar ratio of greater than 2:1 optionally greater than 5:1, optionally greater than 10:1, optionally greater than 30:1, optionally greater than 100:1, and optionally greater than 150:1. The $SiO_2:Al_2O_3$ molar ratio is optionally less than 500, optionally less than 300, or optionally less than 200. While the presence of aluminium within the framework structure does contribute acidic sites to the catalyst it also is associated with a reduction in thermal stability of the zeolite. Many industrial organic feedstock conversion processes are carried out at temperatures which require the use of zeolite supports having a $SiO_2:Al_2O_3$ molar ratio of greater than 6:1 or even greater than 10:1.

The molecular sieve optionally has a degree of crystallinity of at least 50% optionally at least 80%, optionally at least 90%, preferably at least 95% and most preferably at least 98%. In one embodiment the molecular sieve is essentially pure crystalline material. The degree of crystallinity may be calculated via x-ray diffraction (XRD).

In one embodiment the molecular sieve is in as-made form and optionally comprises a structure directing agent Q, within its pores.

In an alternative embodiment the molecular sieve does not comprise a structure directing agent Q. For example, the molecular sieve may be one which can be synthesized without any structure directing agent Q.

The molecular sieve may be in calcined form. The molecular sieve crystals can be "as-synthesized" crystals that still contain the organic template, or the crystals can be calcined crystals, such as K-form molecular sieve crystals or Na-form molecular sieve crystals, or the crystals can be calcined and ion-exchanged crystals, such as H-form molecular sieve crystals.

The molecular sieve of the invention in its calcined, acid form preferably has an external acidity which is at least 1.10 times, more preferably at least 1.30 times, and in some case at least 1.50 times the external acidity of a molecular sieve made using an equivalent process except that the synthesis mixture does not include any morphology modifier L. The external acidity may be measured by collidine adsorption.

The molecular sieve of the invention may in its calcined, acid form, have an external surface area which is at least 1.10 times, more preferably at least 1.20 times, and in some cases 1.30 times the external surface area of a molecular sieve made using an equivalent process except that the synthesis mixture does not include any morphology modifier L. The external surface area may be measured by BET.

The molecular sieve of the invention in its calcined form preferably has a ratio of external surface area to internal surface area of greater than 1.20 and/or has a ratio of external acidity, as measured by collidine absorption, to internal acidity, as measured by ammonia absorption, of greater than 1.50.

The molecular sieve of the present invention or manufactured by the process of the present invention may be used as an adsorbent or as a catalyst to catalyze a wide variety of organic compound conversion processes including many of present commercial/industrial importance. Examples of preferred chemical conversion processes which can be effectively catalyzed by the zeolite of the present invention or manufactured by the process of the present invention, by itself or in combination with one or more other catalytically active substances including other crystalline catalysts, include those requiring a catalyst with acid activity or hydrogenation activity. Examples of organic conversion processes which may be catalyzed by zeolite of the present invention or manufactured by the process of the present invention include cracking, hydrocracking, isomerization, polymerization, reforming, hydrogenation, dehydrogenation, dewaxing, hydrodewaxing, adsorption, alkylation, transalkylation, dealkylation, hydrodecylization, disproportionation, oligomerization, dehydrocyclization and combinations thereof. The conversion of hydrocarbon feeds can take place in any convenient mode, for example in fluidized bed, ebullating bed, moving bed, or fixed bed reactors depending on the types of process desired.

Once the molecular sieve has been synthesized, it can be formulated into a catalyst composition by combination with other materials, such as binders and/or matrix materials that provide additional hardness or catalytic activity to the finished catalyst. These other materials can be inert or catalytically active materials.

In particular, it may be desirable to incorporate the molecular sieve of the present invention or manufactured by the process of the present invention with another material that is resistant to the temperatures and other conditions employed in organic conversion processes. Such materials include synthetic or naturally occurring zeolites as well as inorganic materials such as clays, silica and/or metal oxides such as alumina, yttria, zirconia, gallium oxide, zinc oxide and mixtures thereof. The metal oxides may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon conversion processes. Thus the molecular sieve of the present invention or manufactured by the process of the present invention may be used in the form of an extrudate with a binder. They are typically bound by forming a pill, sphere, or extrudate. The extrudate is usually formed by extruding the molecular sieve, optionally in the presence of a binder, and drying and calcining the resulting extrudate. Further treatments such as steaming, addition of catalytic metal or metals, and/or ion exchange may be carried out as required. The molecular sieve may optionally be bound with a binder having a surface area of at least 200 m²/g, optionally at least 300 m²/g.

Binders may suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions.

In addition to the foregoing materials, the molecular sieve of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of molecular sieve and inorganic oxide matrix may vary widely, with the molecular sieve content ranging from about 1 to about 100 percent by weight and more usually, particularly when the composite is prepared in the form of extrudates, in the range of about 2 to about 95, optionally from about 20 to about 90 weight percent of the composite.

Additional Embodiments

Additionally or alternately, the present disclosure can include one or more of the following embodiments.

Embodiment 1

A process of preparing crystals of a molecular sieve, the process comprising the steps of:

a. combining a source of a tetravalent element X, a morphology modifier L, water, optionally a source of hydroxide ions, optionally a structure directing agent Q, optionally a source of a trivalent element Y, optionally a source of a pentavalent element Z, optionally a source of halide ions W⁻, optionally a source of alkali metal ions M⁺ and/or alkaline earth metal cations M²⁺, and optionally one or more other components to form a synthesis mixture;

b. heating said synthesis mixture under crystallization conditions for a time of about 1 hour to 100 days to form the crystals of the molecular sieve; and c. recovering said crystals of the molecular sieve from the synthesis mixture;

wherein the morphology modifier L is selected from the group consisting of cationic surfactants having a single quaternary ammonium group comprising at least one hydrocarbyl group having at least 12 carbon atoms, nonionic surfactants, anionic surfactants, sugars and combinations thereof, and is present in the synthesis mixture before nucleation or crystallization of the crystals begins;

wherein if the molecular sieve is one which requires a structure directing agent Q, the morphology modifier L is different from and is present in addition to the structure directing agent Q; wherein the molar ratio L:X in the synthesis mixture is in the range of from 0.0001 to 0.03; and wherein the synthesis mixture is a liquid or a mixture of solid and liquid and the liquid is substantially a single phase.

Embodiment 2

A process of Embodiment 1, wherein the molecular sieve is a zeolite in which X is selected from Si, Ge and mixtures thereof and Y is selected from Al, B, Ga, Zn and mixtures thereof.

Embodiment 3

A process of Embodiment 2, wherein X=Si and Y=Al.

Embodiment 4

A process of any of the above embodiments in which the molecular sieve has a framework structure selected from the group consisting of MRE, MWW, MTW, FAU, EMT, MFS, MEI, BEA and its polymorphs, TON and MTT.

Embodiment 5

A process of any of the above embodiments in which the molar ratio L:X in the synthesis mixture is in the range of from 0.001 to 0.025.

Embodiment 6

A process of any of the above embodiments in which the morphology modifier L is a cationic surfactant having a single quaternary ammonium group and at least one C12 to C30 alkyl group bonded to the quaternary ammonium group.

Embodiment 7

A process of any of the above embodiments in which the morphology modifier L is a cationic surfactant having the formula (1)

$$(R^1)_q(R^2)_{4-q}N^+(X^{n-})_{1/n} \qquad (1)$$

wherein each $R^1$ is independently a $C_1$-$C_6$, optionally a $C_1$ to $C_4$, alkyl group which may be linear or branched, saturated or unsaturated, preferably linear and saturated; $R^2$ is a $C_{12}$ to $C_{30}$, optionally $C_{14}$ to $C_{30}$, optionally $C_{16}$ to $C_{30}$, optionally Cis to $C_{30}$ alkyl group which may be branched or linear, saturated or unsaturated, preferably linear and saturated; q is 1 or 2, preferably 1; $X^-$ is an anion of valency n; and $X^-$ is optionally a hydroxide anion or a halide anion, especially a halide anion selected from fluoride, chloride or bromide.

Embodiment 8

A process of any of Embodiments 1 to 5 in which the morphology modifier L is a monosaccharide.

Embodiment 9

A process of any of Embodiments 1 to 5 in which the morphology modifier L is an anionic surfactant.

Embodiment 10

A process of any of Embodiments 1 to 5 in which the morphology modifier L is a nonionic surfactant.

Embodiment 11

A process of any of Embodiments 1 to 10 which includes the step of calcining the crystals recovered in step c) to give the calcined form of the molecular sieve.

Embodiment 12

A molecular sieve prepared by the process of any of the above Embodiments in its as-made form or its calcined form.

Embodiment 13

A molecular sieve of Embodiment 12 having an external acidity which is at least 1.10 times the external acidity of a molecular sieve made using an equivalent process except that the synthesis mixture does not include any morphology modifier L.

Embodiment 14

A molecular sieve of Embodiment 12 or 13 having an external surface area which is at least 1.10 times the external surface area of a molecular sieve made using an equivalent process except that the synthesis mixture does not include any morphology modifier L.

Embodiment 15

A catalyst comprising the molecular sieve of any of Embodiments 12 to 14, and optionally including a binder.

Embodiment 16

A hydrocarbon conversion process comprising the step of contacting a hydrocarbon feedstock with a catalyst of Embodiment 15.

Embodiment 17

A hydrocarbon conversion process of Embodiment 16, which is a dewaxing, oligomerization, alkylation, isomerization or cracking process.

THE EXAMPLES

Syntheses of ZSM-48 were carried out according to the following procedures using hexamethonium dichloride (HMDC) as structure directing agent and different morphology modifiers.

Example 1 (Comparative). ZSM-48 Reference, No Morphology Modifier, Modifier/SiO$_2$=0.0, Morphology Modifier Present at 0 wt % of Total Mixture Dilute 1.26 g of 25% hexamethonium dichloride (HMDC) in 14.8 g of water. Stir to make sure the solution is homogeneous. Add 0.62 g of a sodium aluminate solution (7.8% Na$_2$O, 10.0% Al$_2$O$_3$, 82.2% water) to the structure directing solution. Stir to homogenize the solution.
Add 3.6 g of 10% NaOH solution to the HMDC/aluminate solution. Stir to homogenize the mixture. Add 0.73 g of colloidal beta seeds (17.2 wt % seeds) to the aluminate mixture. Add 3.95 g of Ultrasil VN3 PM modified precipitated silica (92.4% Sift) to the mixture. Stir the mixture for 15 minutes to prepare a homogeneous slurry. An approximate molar gel composition for the mixture is as follows:
SiO$_2$/Al$_2$O$_3$=100.0
OH$^-$/SiO$_2$=0.175
HMDC/SiO$_2$=0.019
Modifier/SiO$_2$=0.000
H$_2$O/SiO$_2$=18.7
~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Transmission Electron Microscopy (TEM) revealed that the crystals had lengths generally in the range of 30 to 50 nm and widths in the range of from 10 to 15 nm with a length:width aspect ratio of from 3 to 5.

Example 2. ZSM-48, Brij L4 Morphology Modifier, Morphology Modifier/SiO$_2$=0.017, 1.5 wt % of Total Mixture Dilute 1.27 g of 25% hexamethonium dichloride (HMDC) in 13.0 g of water. Stir to make sure the solution is homogeneous. Add 0.59 g of a sodium aluminate solution (7.5% Na$_2$O, 10.2% Al$_2$O$_3$, 82.3% water) to the structure directing solution. Stir to homogenize the solution. Add 3.6 g of 10% NaOH solution to the HMDC/aluminate solution. Stir to homogenize the mixture. Add 0.75 g of colloidal beta seeds (16.7 wt % seeds) to the aluminate mixture. Add 1.96 g of a 19.2 wt % solution of Brij L4 (polyethylene glycol dodecyl ether as nonionic surfactant morphology modifier) and stir the mixture to dissolve the zeolite growth modifier. Add 3.89 g of Ultrasil VN3 PM modified precipitated silica (92.4% SiO$_2$) to the mixture. Stir the mixture for 15 minutes to prepare a homogeneous slurry. An approximate molar gel composition for the mixture is as follows:
SiO$_2$/Al$_2$O$_3$=100.0
OH$^-$/SiO$_2$=0.175
HMDC/SiO$_2$=0.019
Modifier/SiO$_2$=0.018
H$_2$O/SiO$_2$=18.7
~5200 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 3. ZSM-48, Brij 93 Morphology Modifier, Morphology Modifier/SiO$_2$=0.018, 1.5 wt % of Total Mixture Dilute 1.27 g of 25% hexamethonium dichloride (HMDC) in 12.9 g of water. Stir to make sure the solution is homogeneous. Add 0.59 g of a sodium aluminate solution (7.5% Na$_2$O, 10.2% Al$_2$O$_3$, 82.3% water) to the structure directing solution. Stir to homogenize the solution. Add 3.6 g of 10% NaOH solution to the HMDC/aluminate solution. Stir to homogenize the mixture. Add 0.75 g of colloidal beta seeds (16.7 wt % seeds) to the aluminate mixture. Add 2.02 g of a 18.5 wt % solution of Brij 93 (polyethylene glycol oleyl ether as nonionic surfactant morphology modifier) and stir the mixture to dissolve the zeolite growth modifier. Add 3.89 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
$SiO_2/Al_2O_3$=100.0
$OH^-/SiO_2$=0.175
$HMDC/SiO_2$=0.019
$Modifier/SiO_2$=0.018
$H_2O/SiO_2$=18.7
~5200 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 4. ZSM-48, Sodium Octylsulfate Morphology Modifier, Morphology Modifier/$SiO_2$=0.027, 1.5 wt % of Total Mixture Dilute 1.27 g of 25% hexamethonium dichloride (HMDC) in 13.0 g of water. Stir to make sure the solution is homogeneous. Add 0.60 g of a sodium aluminate solution (7.5% $Na_2O$, 10.2% $Al_2O_3$, 82.3% water) to the structure directing solution. Stir to homogenize the solution. Add 3.6 g of 10% NaOH solution to the HMDC/aluminate solution. Stir to homogenize the mixture. Add 0.75 g of colloidal beta seeds (16.7 wt % seeds) to the aluminate mixture. Add 1.86 g of a 20 wt % solution of sodium octylsulfate and stir the mixture to dissolve the zeolite growth modifier. Add 3.89 g of Ultrasil VN3 PM modified precipitated silica (92.4% Sift) to the mixture. Stir the mixture for 15 minutes to prepare a homogeneous slurry. An approximate molar gel composition for the mixture is as follows:
$SiO_2/Al_2O_3$=100.0
$OH^-/SiO_2$=0.175
$HMDC/SiO_2$=0.019
$Modifier/SiO_2$=0.027
$H_2O/SiO_2$=18.7
~5200 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 5 (Comparative). ZSM-48, 1,2-Hexanediol Comparative Modifier, Comparative Modifier/$SiO_2$=0.053, 1.5 wt % of Total Mixture Dilute 1.27 g of 25% hexamethonium dichloride (HMDC) in 13.1 g of water. Stir to make sure the solution is homogeneous. Add 0.60 g of a sodium aluminate solution (7.5% $Na_2O$, 10.2% $Al_2O_3$, 82.3% water) to the structure directing solution. Stir to homogenize the solution. Add 3.6 g of 10% NaOH solution to the HMDC/aluminate solution. Stir to homogenize the mixture. Add 0.75 g of colloidal beta seeds (16.7 wt % seeds) to the aluminate mixture. Add 1.86 g of a 20.1 wt % solution of 1,2-hexandiol and stir the mixture to dissolve the zeolite growth modifier. Add 3.89 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
$SiO_2/Al_2O_3$=100.0
$OH^-/SiO_2$=0.175
$HMDC/SiO_2$=0.019
$Modifier/SiO_2$=0.053
$H_2O/SiO_2$=18.7
~5200 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 6. ZSM-48, Trimethyloctadecylammonium Bromide Morphology Modifier, Morphology Modifier/$SiO_2$=0.021, 2.0 wt % of Total Mixture Dilute 1.26 g of 25% hexamethonium dichloride (HMDC) in 12.5 g of water. Stir to make sure the solution is homogeneous. Add 0.61 g of a sodium aluminate solution (7.8% $Na_2O$, 10.0% $Al_2O_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 2.51 g of a 20 wt % trimethyloctadecylammonium bromide (cationic surfactant morphology modifier) solution and stir the mixture to dissolve the morphology modifier. Add 3.87 g of Ultrasil VN 3 PM modified precipitated silica (92.4% $SiO_2$) to the mixture. Stir the mixture for 15 minutes to prepare a homogeneous slurry. An approximate molar gel composition for the mixture is as follows:
$SiO_2/Al_2O_3$=100.0
$OH^-/SiO_2$=0.175
$HMDC/SiO_2$=0.019
$Modifier/SiO_2$=0.021
$H_2O/SiO_2$=18.7
~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 7. ZSM-48, Sodium Lauryl Sulfate Morphology Modifier, Morphology Modifier/$SiO_2$=0.028, 2.0 wt % of Total Mixture Dilute 1.24 g of 25% hexamethonium dichloride (HMDC) in 12.5 g of water. Stir to make sure the solution is homogeneous. Add 0.61 g of a sodium aluminate solution (7.8% $Na_2O$, 10.0% $Al_2O_3$, 82.2% water) to the structure directing solution. Stir to homogenize the solution.

Add 3.6 g of 10% NaOH solution to the HMDC/aluminate solution. Stir to homogenize the mixture. Add 0.73 g of colloidal beta seeds (17.2 wt % seeds) to the aluminate mixture. Add 2.5 g of a 20 wt % solution of sodium lauryl sulfate (anioinic surfactant morphology modifier) and stir the mixture to dissolve the morphology modifier. Add 3.90 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
$SiO_2/Al_2O_3$=100.2
$OH^-/SiO_2$=0.174
$HMDC/SiO_2$=0.019
$Modifier/SiO_2$=0.028
$H_2O/SiO_2$=18.6
~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 8 ZSM-48,
Benzylhexadecyldimethylammonium Chloride
Morphology Modifier, Morphology
Modifier/SiO2=0.016, 1.5 wt % of Total Mixture Dilute 1.24 g of 25% hexamethonium dichloride (HMDC) in 13.1 g of water. Stir to make sure the solution is homogeneous. Add 0.61 g of a sodium aluminate solution (7.8% Na2O, 10.0% $Al_2O_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 1.88 g of a 20 wt % solution of benzylhexadecyldimethylammonium chloride (cationic surfactant morphology modifier) and stir the mixture to dissolve the morphology modifier. Add 3.89 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
  SiO2/Al2O3=100.0
  OH–/SiO2=0.175
  HMDC/SiO2=0.019
  Modifier/SiO2=0.016
  H2O/SiO2=18.7
  ~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 9. ZSM-48
Dihexadecyldimethylammonium Bromide
Morphology Modifier, Morphology
Modifier/SiO2=0.012, 1.5 wt % of Total Mixture Dilute 1.24 g of 25% hexamethonium dichloride (HMDC) in 13.1 g of water. Stir to make sure the solution is homogeneous. Add 0.61 g of a sodium aluminate solution (7.8% Na2O, 10.0% $Al_2O_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 1.86 g of a 20 wt % solution of dihexadecyldimethylammonium bromide (cationic surfactant morphology modifier) and stir the mixture to dissolve the morphology modifier. Add 3.89 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
  SiO2/Al2O3=100.0
  OH–/SiO2=0.175
  HMDC/SiO2=0.019
  Modifier/SiO2=0.012
  H2O/SiO2=18.7
  ~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Example 10. ZSM-48 Lithium Dodecyl Sulfate
Morphology Modifier, Morphology
Modifier/SiO2=0.023, 1.5 wt % of Total Mixture Dilute 1.24 g of 25% hexamethonium dichloride (HMDC) in 13.1 g of water. Stir to make sure the solution is homogeneous. Add 0.61 g of a sodium aluminate solution (7.8% Na2O, 10.0% $Al_2O_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 1.86 g of a 20 wt % solution of lithium dodecyl sulfate (anionic surfactant morphology modifier) and stir the mixture to dissolve the morphology modifier. Add 3.89 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
  SiO2/Al2O3=100.0
  OH–/SiO2=0.175
  HMDC/SiO2=0.019
  Modifier/SiO2=0.023
  H2O/SiO2=18.7
  ~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

Transmission Electron Microscopy (TEM) revealed that the crystals had lengths generally in the range of 30 to 60 nm and widths in the range of around 30 nm with a length:width aspect ratio range of from 1 to 2.

Example 11. ZSM-48 Pluronic EO-PO-EO
Morphology Modifier, Morphology
Modifier/SiO2=0.002, 1.0 wt % of Total Mixture Dilute 1.25 g of 25% hexamethonium dichloride (HMDC) in 13.7 g of water. Stir to make sure the solution is homogeneous. Add 0.61 g of a sodium aluminate solution (7.8% Na2O, 10.0% $Al_2O_3$, 82.2% water) to the structure directing solution. Stir to homogenize the solution. Add 3.6 g of 10% NaOH solution to the HMDC/aluminate solution. Stir to homogenize the mixture. Add 0.73 g of colloidal beta seeds (17.2 wt % seeds) to the aluminate mixture. Add 1.24 g of a 20 wt % solution of Pluronic EO-PO-EO tri-block co-polymer) nonionic surfactant morphology modifier) and stir the mixture to dissolve the morphology modifier. Add 3.91 g of Ultrasil VN3 PM modified precipitated silica (92.4% $SiO_2$) to the mixture. Stir the mixture for 15 minutes to prepare a homogeneous slurry. An approximate molar gel composition for the mixture is as follows:
  SiO2/Al2O3=100.0
  OH–/SiO2=0.175
  HMDC/SiO2=0.019
  Modifier/SiO2=0.0007
  H2O/SiO2=18.7
  ~5100 ppm of seed Seal the autoclaves and continue to stir the mixture at 300 rpm with a U-type agitator. Heat the mixture to 160° C. (20° C./hr. ramp rate) and hold for 28 hours. Isolate the solid via vacuum filtration and wash with 3 volumes of water. Dry the material in an oven at 120° C. X-ray diffraction indicates that the powder is ZSM-48.

The following syntheses of MCM-49 were carried out using hexamethyleneimine (HMI) as structure directing agent according to the following procedures.

Example 12. MCM-49 Reference No Morphology Modifier, Morphology Modifier/SiO2=0.000, 0 wt % of Total Mixture Dilute 3.54 g of 40 wt % solution of aluminum sulfate octahydrate in 12.0 g of water. Add 4.1 g of 20% NaOH solution to the aluminum sulfate solution. Stir to homogenize the mixture. Add 3.46 g of Ultrasil VN3 PM modified precipitated silica (92.4% SiO2) to the sodium aluminate solution. Stir the mixture until the slurry appears to be homogeneous. Add 1.86 g of hexamethyleneimine (HMI) to the slurry. Stir the mixture for 10 minutes to prepare a homogeneous slurry. An approximate molar gel composition for the mixture is as follows:

SiO2/Al2O3=25.0
OH−/SiO2=0.390
HMI/SiO2=0.350
Modifier/SiO2=0.000
H2O/SiO2=18.5

Seal the autoclaves and continue to stir the mixture at 360 rpm with a U-type agitator. Heat the mixture to 143° C. (20° C./hr. ramp rate) and hold for 125 hrs. Isolate the solid via vacuum filtration and wash with 3 volumes of water. Dry the material in an oven at 120° C. X-ray diffraction indicates that the powder is MCM-49/MCM-22 structure type.

Example 13. MCM-49 Cetyltrimethylammonium Bromide Morphology Modifier, Morphology Modifier/SiO2=0.013, 1 wt % of Total Mixture Dilute 3.51 g of 40 wt % solution of aluminum sulfate octahydrate in 10.9 g of water. Add 4.1 g of 20% NaOH solution to the aluminum sulfate solution. Stir to homogenize the mixture. Add 3.42 g of Ultrasil VN3 PM modified precipitated silica (92.4% SiO2) to the sodium aluminate solution. Stir the mixture until the slurry appears to be homogeneous. Add 1.85 g of hexamethyleneimine (HMI) to the slurry. Add 1.26 g of a 20 wt % solution of cetyltrimethylammonium bromide (cationic surfactant morphology modifier) to the slurry. Stir the mixture for 10 minutes to prepare a homogeneous slurry. An approximate molar gel composition for the mixture is as follows:

SiO2/Al2O3=25.0
OH−/SiO2=0.390
HMI/SiO2=0.350
Modifier/SiO2=0.013
H2O/SiO2=19.6

Seal the autoclaves and continue to stir the mixture at 360 rpm with a U-type agitator. Heat the mixture to 143° C. (20° C./hr. ramp rate) and hold for 125 hrs. Isolate the solid via vacuum filtration and wash with 3 volumes of water. Dry the material in an oven at 120° C. X-ray diffraction indicates that the powder is MCM-49/MCM-22 structure type.

Example 14. MCM-49 Sodium Lauryl Sulfate Morphology Modifier, Morphology Modifier/SiO2=0.016, 1 wt % of Total Mixture Dilute 3.51 g of 40 wt % solution of aluminum sulfate octahydrate in 10.9 g of water. Add 4.1 g of 20% NaOH solution to the aluminum sulfate solution. Stir to homogenize the mixture. Add 3.42 g of Ultrasil VN3 PM modified precipitated silica (92.4% SiO2) to the sodium aluminate solution. Stir the mixture until the slurry appears to be homogeneous. Add 1.85 g of hexamethyleneimine (HMI) to the slurry. Add 1.26 g of a 20 wt % solution of sodium lauryl sulfate (anionic surfactant morphology modifier) to the slurry. Stir the mixture for 10 minutes to prepare a homogeneous slurry. An approximate molar gel composition for the mixture is as follows:

SiO2/Al2O3=25.0
OH−/SiO2=0.390
HMI/SiO2=0.350
Modifier/SiO2=0.016
H2O/SiO2=19.6

Seal the autoclaves and continue to stir the mixture at 360 rpm with a U-type agitator. Heat the mixture to 143° C. (20° C./hr. ramp rate) and hold for 125 hrs. Isolate the solid via vacuum filtration and wash with 3 volumes of water. Dry the material in an oven at 120° C. X-ray diffraction indicates that the powder is MCM-49/MCM-22 structure type.

Example 15. ZSM-48 Fructose Morphology Modifier, Modifier/SiO2=0.020, 1.0 wt. % of Total Mixture Dilute 1.39 g of 56% hexamethonium dichloride (HMDC) in 14.4 g of water. Stir to make sure the solution is homogeneous. Add 1.42 g of a sodium aluminate solution (20% NaOH, 7.8% Al(OH)$_3$, 72.2% water) to the structure directing solution. Stir to homogenize the solution. Add 2.6 g of 10% NaOH solution to the HMDC/aluminate solution. Stir to homogenize the mixture. Add 0.03 g of ZSM-48 seeds to the aluminate mixture. Add 0.63 g of a 39.7% solution of fructose and stir to homogenize the mixture. Add 4.62 g of Ultrasil VN3 PM modified precipitated silica (92.4% SiO2) to the mixture. Stir the mixture for 15 minutes to prepare a homogeneous slurry. An approximate molar gel composition for the mixture is as follows:

SiO2/Al2O3=99.9
OH−/SiO2=0.190
HMDC/SiO2=0.040
Modifier/SiO2=0.020
H2O/SiO2=14.9−
~1000 ppm of seed Seal the autoclaves and continue to stir the mixture at 300 rpm with a U-type agitator. Heat the mixture to 157° C. (60° C./hr. ramp rate) and hold for 30 hours. Isolate the solid via vacuum filtration and wash with 3 volumes of water. Dry the material in an oven at 120° C. X-ray diffraction indicates that the powder is ZSM-48.

Post-Synthesis Treatments and Measurements

The samples of molecular sieve made according to Examples 1 to 15 above were subjected to the following treatments.

After crystallization is complete and the material is determined to be crystalline via XRD, the crystal is ion-exchanged with NH$_4$NO$_3$ twice, washed with water, and dried in an oven at 120° C. The ammonium form of the powder is then calcined in air at 550° C. for 2 hours to produce the acid form of the zeolite crystal.

The acid form of the crystal is then characterized using collidine adsorption to evaluate the acidity of the catalyst. The Nitrogen BET technique is used to determine the surface area, total and external, and pore volume of the crystal. This data is collected for the reference material and each inventive modified material and the ratios of External Surface Area and Collidine absorption of each inventive example to the reference example of the same zeolite are shown in Table 1 to demonstrate the changes in acidity and external surface area of the modified crystals caused by the presence of the morphology modifier in the synthesis mixture.

The BET analysis was carried out as described in S. J. Gregg, K. S. W. Sing, "Adsorption, Surface Area and Porosity", 1st ed., Academic Press, N.Y. (1967) pp 30-31.

Ammonia and Collidine absorption tests were carried out generally as described in J. Phys. Chem. B, 2002, 106 (2), pp 395-400 (note that the equipment was in some cases slightly different, but the measurements were carried out on thermogravimetric balances in all cases).

TABLE 1

Collidine absorption and External SA results for Examples 1 to 15.

| Example | Zeolite | Modifier | Collidine/ Collidine of reference | External SA/ External SA of reference |
|---|---|---|---|---|
| 1 | ZSM-48 | none | 1.00 | 1.00 |
| 2 | ZSM-48 | Brij L4 | 1.04 | 1.10 |
| 3 | ZSM-48 | Brij 93 | 1.08 | 1.20 |
| 4 | ZSM-48 | sodium octylsulfate | 1.01 | 1.20 |
| 5 | ZSM-48 | 1,2-hexanediol | 1.00 | 1.00 |
| 6 | ZSM-48 | trimethyloctadecyl-ammonium bromide | 1.66 | 1.73 |
| 7 | ZSM-48 | sodium lauryl sulfate | 0.98 | 0.90 |
| 8 | ZSM-48 | benzylhexadecyldimethyl-ammonium chloride | 1.14 | 1.10 |
| 9 | ZSM-48 | dihexadecyldimethyl-ammonium bromide | 1.00 | 1.10 |
| 10 | ZSM-48 | lithium dodecyl sulfate | 0.72 | 0.80 |
| 11 | ZSM-48 | Pluronic EO-PO-EO | 1.17 | 1.10 |
| 12 | MCM-49 | none | 1.00 | 1.00 |
| 13 | MCM-49 | cetyltrimethylammonium bromide | 1.25 | 1.53 |
| 14 | MCM-49 | sodium lauryl sulfate | 1.06 | 1.22 |
| 15 | ZSM-48 | fructose | — | 1.17 |

The results in Table 1 show that the use of 1,2-hexanediol, which is not a morphology modifier as described herein, no effect was seen on either collidine absorption or external surface area, which were the same as for the reference ZSM-48 of comparative Example 1.

For inventive Examples 2-4, 6, 8-11, and 13 to 15 the presence of the morphology modifier had a noticeable effect on the collidine absorption and/or the external SA as compared to the synthesis of the reference material with no morphology modifier present. In Example 7 the recorded collidine absorption and External SA values were lower than for the reference synthesis of the same zeolite with no morphology modifier present, but were within 10% and so may have been due to experimental error. For Example 10, the collidine absorption and external SA results were lower than for the reference material. In this case, TEM results showed that the aspect ratio of the crystals made in the presence of lithium dodecyl sulfate as morphology modifier was significantly reduced as compared to the reference ZSM-48, principally because the width of the crystals increased compared to the reference materials. In ZSM-48 the one-dimensional channels in the framework run lengthways through the crystal, and so an increase in the width of the crystal compared to the length may make those channels more available to incoming reactant molecules.

The invention claimed is:

1. A process of preparing crystals of a molecular sieve, the process comprising the steps of:
   a. combining at least a source of a tetravalent element X, a morphology modifier L, and water to form a synthesis mixture;
   b. heating said synthesis mixture under crystallization conditions for a time of about 1 hour to 100 days to form the crystals of the molecular sieve; and
   c. recovering said crystals of the molecular sieve from the synthesis mixture;
   wherein the morphology modifier L is selected from the group consisting of cationic surfactants having a single quaternary ammonium group comprising at least one hydrocarbyl group having at least 12 carbon atoms, and is present in the synthesis mixture before nucleation or crystallization of the crystals begins;
   wherein if the molecular sieve is one which requires a structure directing agent Q, the morphology modifier L is different from and is present in addition to the structure directing agent Q;
   wherein the molar ratio L:X in the synthesis mixture is in the range of from 0.0001 to 0.03; and
   wherein the synthesis mixture is a liquid that is substantially a single phase, or a mixture of solid and a liquid that is substantially a single phase is substantially a single phase;
   and wherein the molecular sieve has a framework structure selected from the group consisting of MRE, MWW, MTW, FAU, EMT, MFS, MEI, BEA and its polymorphs, TON and MTT.

2. A process as claimed in claim 1, wherein in step a) one or more further components selected from the group consisting of a source of hydroxide ions, a structure directing agent Q, a source of a trivalent element Y, a source of a pentavalent element Z, a source of halide ions $W^-$, and a source of alkali metal ions $M^+$ and/or alkaline earth metal cations $M^{2+}$, are also combined into the synthesis mixture.

3. A process as claimed in claim 1 wherein X is selected from Si, Ge and mixtures thereof and the synthesis mixture also comprises a source of a trivalent element Y, where Y is selected from Al, B, Ga, Zn and mixtures thereof.

4. A process as claimed in claim 3 wherein X=Si and Y=Al.

5. A process as claimed in claim 1 in which the molar ratio L:X in the synthesis mixture is in the range of from 0.001 to 0.025.

6. A process as claimed in claim 1 in which the morphology modifier L is a cationic surfactant having the formula (1)

wherein each $R^1$ is independently a $C_1$-$C_6$, optionally a $C_1$ to $C_4$, alkyl group which may be linear or branched, saturated or unsaturated; $R^2$ is a $C_{12}$ to $C_{30}$; q is 1 or 2; $X^-$ is an anion of valency n; and $X^-$ is a hydroxide anion or a halide anion selected from fluoride, chloride or bromide.

7. A process as claimed in claim 1 which includes the step of calcining the crystals recovered in step c) to give the calcined form of the molecular sieve.

* * * * *